United States Patent [19]

Harry et al.

[11] 4,437,825
[45] Mar. 20, 1984

[54] BLOW MOLDING APPARATUS

[75] Inventors: Ieuan L. Harry; Suppayan M. Krishnakumar, both of Nashua; Walter R. Jolly, Merrimack; Martin H. Beck, Brookline, all of N.H.; John F. E. Pocock, Gravenbruch, Fed. Rep. of Germany

[73] Assignee: The Continental Group, Inc., Stamford, Conn.

[21] Appl. No.: 432,039

[22] Filed: Sep. 30, 1982

Related U.S. Application Data

[62] Division of Ser. No. 321,152, Nov. 13, 1981, Pat. No. 4,409,161.

[51] Int. Cl.³ .............................................. B29C 17/07
[52] U.S. Cl. ..................... 425/145; 425/150; 425/529; 425/534; 425/535; 425/541
[58] Field of Search ............... 425/526, 529, 145, 150, 425/535, 534, 537, 541; 264/529, 532, 40.1, 40.5, 40.7; 65/81, 264

[56] References Cited

U.S. PATENT DOCUMENTS

| | | | |
|---|---|---|---|
| 4,066,727 | 1/1978 | Reilly et al. | 264/532 |
| 4,354,813 | 10/1982 | Collombin | 425/526 X |
| 4,357,288 | 11/1982 | Oas et al. | 264/532 X |
| 4,362,498 | 12/1982 | Harry et al. | 425/526 |
| 4,365,950 | 12/1982 | Harry et al. | 425/541 X |
| 4,382,760 | 5/1983 | Waitt et al. | 425/145 X |

Primary Examiner—Jan H. Silbaugh
Attorney, Agent, or Firm—Charles E. Brown

[57] ABSTRACT

This relates to a blow molding apparatus wherein in lieu of the mold halves closing on a preform and thereafter the blowing operation initiated, the preform is shifted into one of the mold halves and thereafter advance of the stretch rod into the preform and movement of the blow head to a position closely adjacent the preform is effected before the closing of the mold is completed. Such arrangement permits a reduction in cycle time. This abstract forms no part of the specification of this application and is not to be construed as limiting the claims of the application.

7 Claims, 10 Drawing Figures

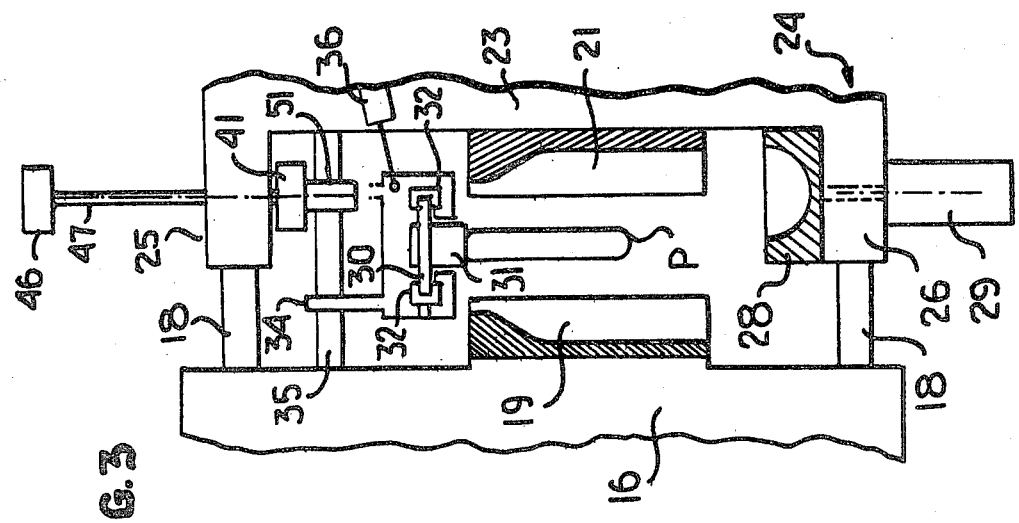
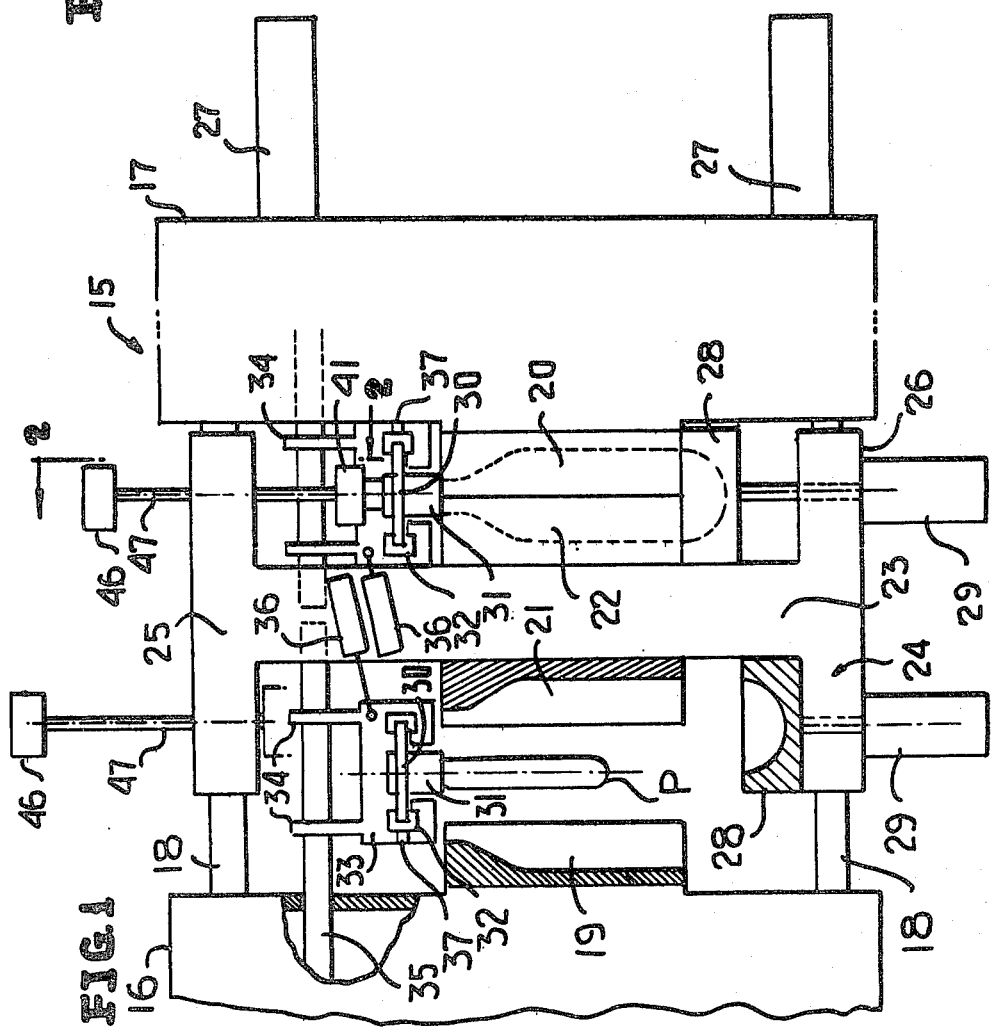

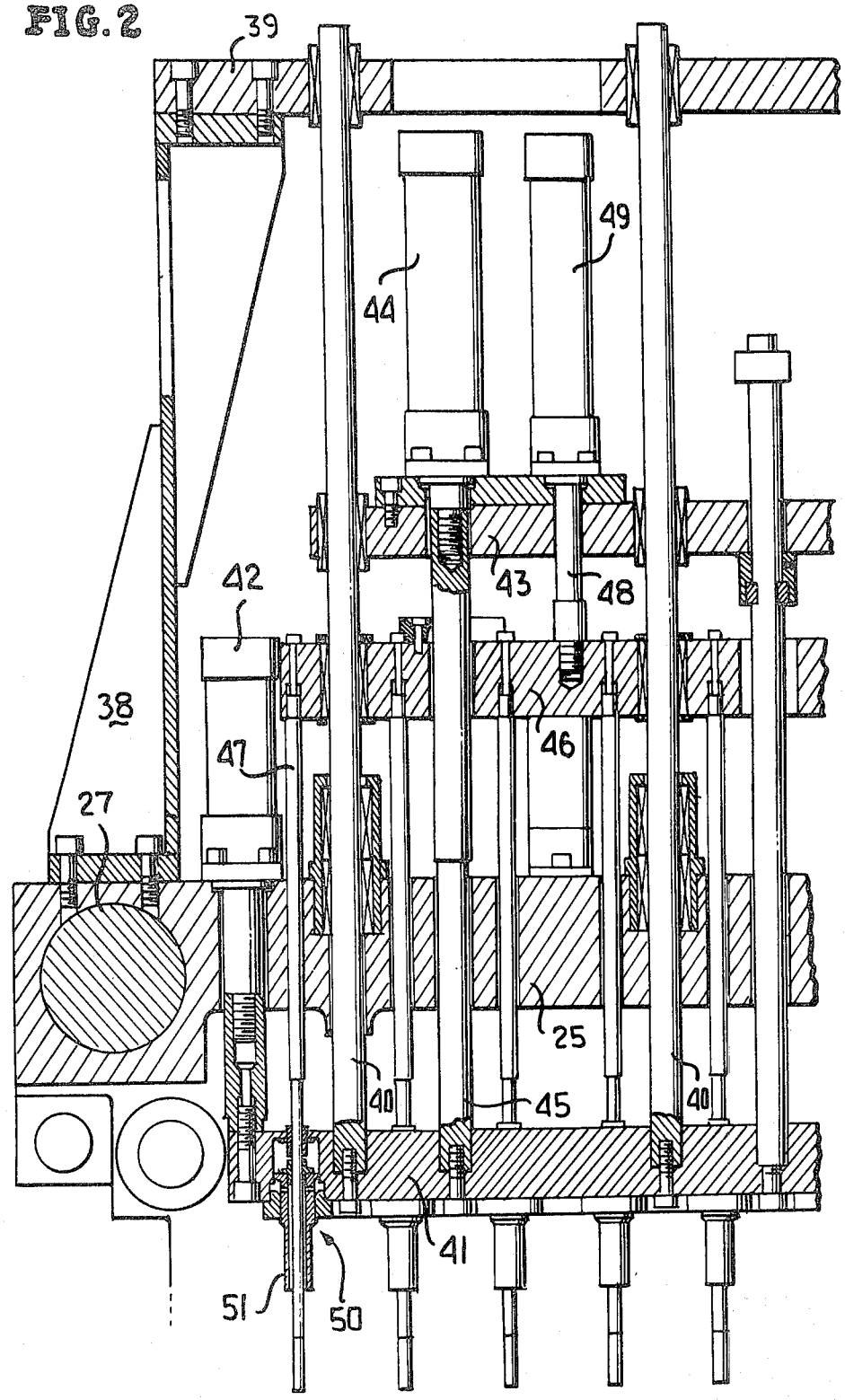

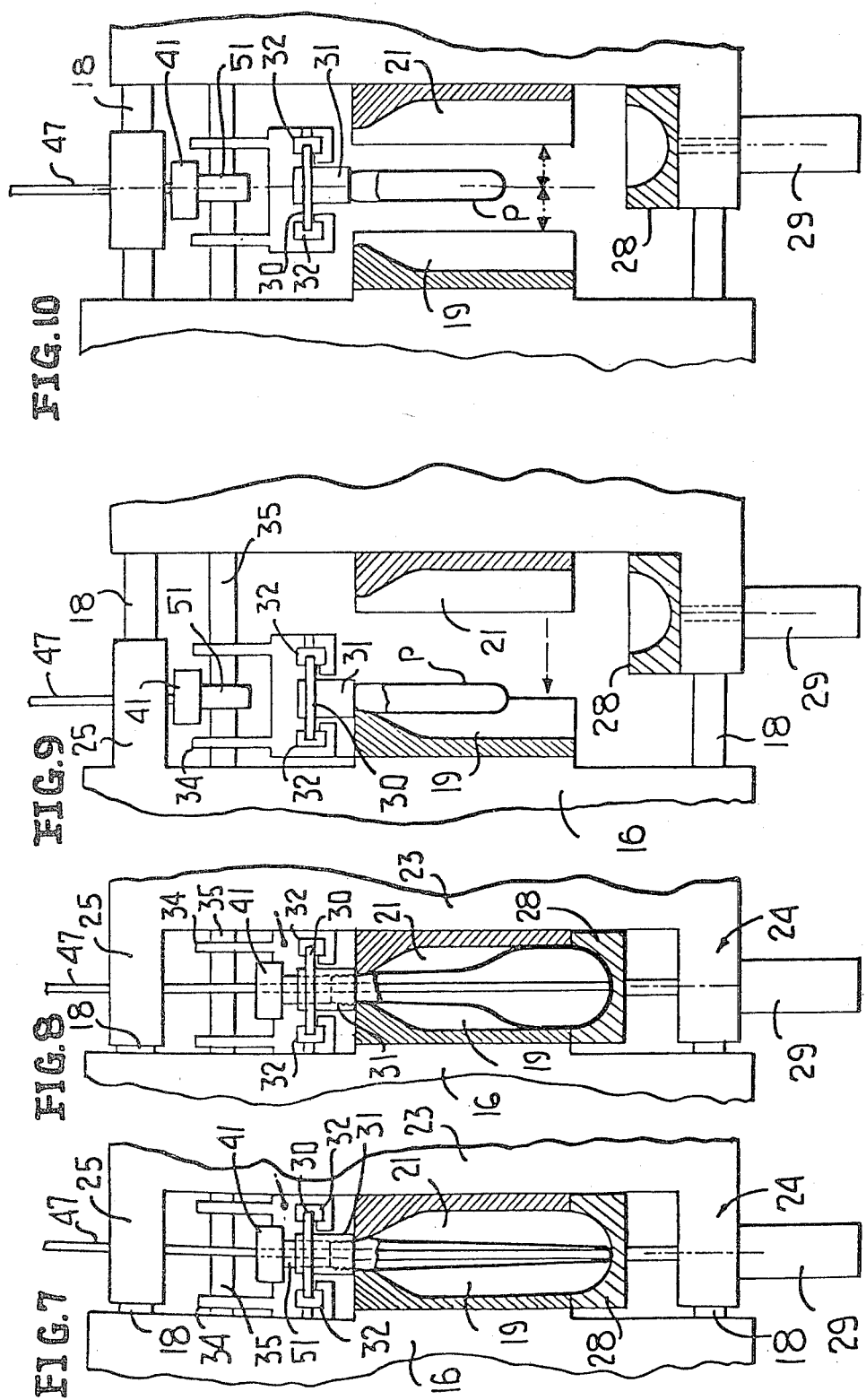

BLOW MOLDING APPARATUS

This is a division of Ser. No. 321,152, filed Nov. 13, 1981, now U.S. Pat. No. 4,409,161.

This invention relates to apparatus for and method of effecting the blow molding of a preform into a molded article such as a bottle in a manner wherein the blow molding cycle may be reduced.

This invention particularly relates to improvements in blow molding apparatus and method of utilizing the same wherein the blow molding apparatus is of a double acting type including two remote sets of fixed mold halves and two adjacent sets of mold halves carried by a movable clamp, with the mold halves being so arranged wherein when one set of molds is in a closed cooperating position, the other set of molds is open for the discharge of articles previously blow molded therein and for the presentation of new preforms. The invention particularly relates to a blow molding apparatus wherein numerous preforms of a number equal to the number of plural molds are carried by a pallet and wherein the plural preforms are simultaneously blow molded to form hollow articles.

In the blow molding of the preforms into hollow articles, each preform is initially axially stretched by way of a stretch rod, after which a blowing gas is introduced into the preform under pressure to blow the same in accordance with the mold cavity. This invention particularly relates to a shortening of the flow cycle by shifting the preform into an associated one of the mold halves wherein the preform is aligned with the stretch rod and the blow head, and then advancing the stretch rod into the preform and the blow head toward the preform, preferably while the mold is still open, but possibly while the mold is in the process of closing.

It is also proposed to advance the stretch rod to stretch the preform and to at least seat the blow head on the preform as soon as the mold closes and before clamping pressure is built up so that as soon as the mold halves are clamped together under sufficient pressure the blowing operation may be initiated. It is also feasible in accordance with this invention to effect an initiation of low pressure blowing of the preform as soon as the mold closes.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a schematic end elevational view of a blow mold assembly in accordance with this invention with one of the molds closed and the other of the molds open and having just positioned therebetween a preform to be blow molded therein.

FIG. 2 is a fragmentary vertical sectional view taken generally along the line 2—2 of FIG. 1, and shows the general arrangement of stretch rods and blow heads for cooperation with the preform which is to be blow molded.

FIG. 3 is a schematic sectional view in the interior of the mold of FIG. 1, and shows generally the initial relationship of mold halves, preforms and blow mechanism.

FIG. 7 is another schematic sectional view with the stretch rod extending to initiate preform axial stretching and the blow head moved into sealing engagement with the preform.

FIG. 8 is a schematic sectional view similar to FIG. 3, with the blowing of the preform having been initiated.

FIG. 9 is a schematic sectional view similar to FIG. 4, wherein the preform is moved into the fixed mold half.

FIG. 10 is also a schematic sectional view similar to FIG. 4, but wherein both mold halves are movable.

Figure 4:
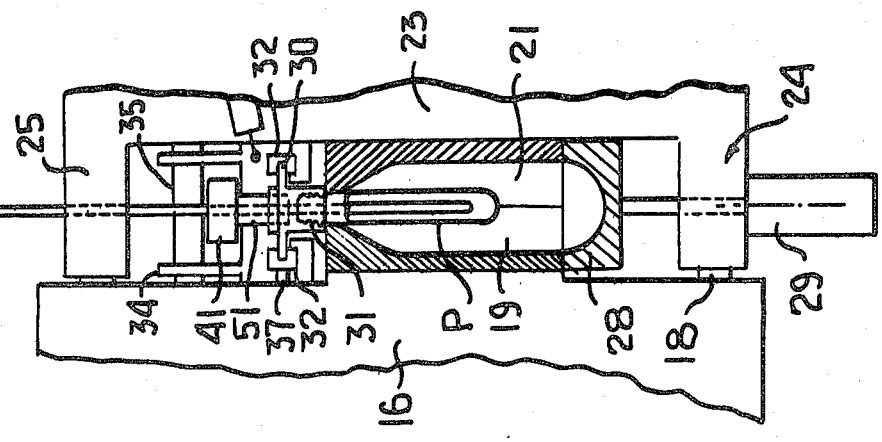
FIG. 4 is a schematic sectional view similar to FIG. 3, but with the preform shifted into position within the movable mold half.
Figure 5:
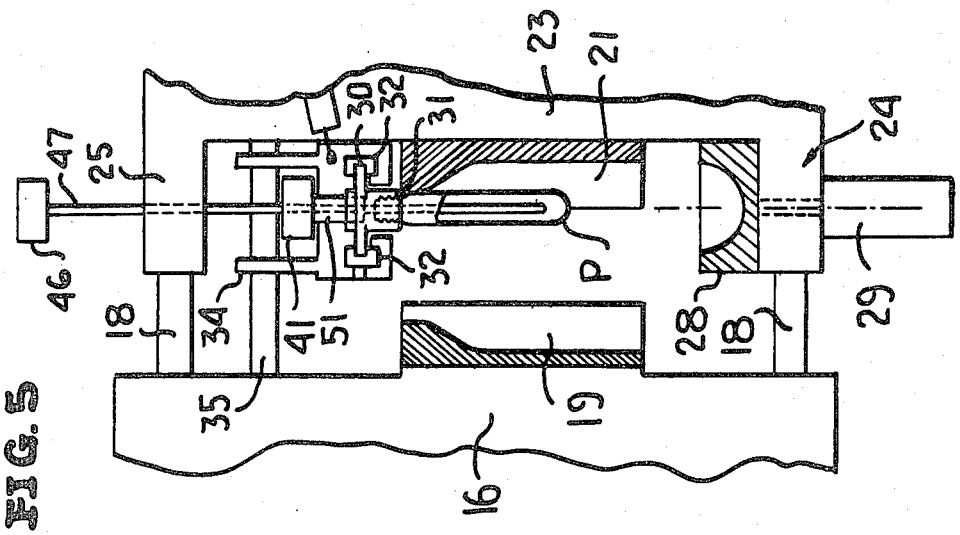
FIG. 5 is a schematic view similar to FIG. 3, with the stretch rod and blow head moved down relative to the preform.

Referring now to the drawings in detail, it will be seen that there is illustrated in FIG. 1 a blow molding assembly generally identified by the numeral 15 and including a pair of spaced apart fixed platens 16, 17 which are joined together by rods 18. The fixed platens 16 and 17 carry fixed mold halves 19 and 20, respectively, which cooperate with movable mold halves 21 and 22, respectively. It is to be understood that the mold halves 19-22 each include a plurality of cavities so that a large number of preforms may be simultaneously blow molded. The number of cavities in each blow mold half may be on the order of twelve to sixteen, although the number may be increased if so desired.

The movable mold halves 21, 22 are mounted on opposite sides of a vertical strut 23 of a clamp 24 which has a general cross section of an I-beam. The clamp 24 also includes an upper flange 25 and a lower flange 26. The clamp is slidably mounted on the rods 18 and is positioned by means of a plurality of double acting fluid cylinders 27 which are carried by the fixed platen 17.

When the article to be blow molded is, for example, a bottle with a recessed base or other type of article requiring a three-piece mold, the mold bottoms 28 are carried by fluid cylinders 29 mounted on the flange 26 for movement toward and away from the mold halves.

The preforms P are directed into the mold unit 15 by way of pallets 30 which have a plurality of collets 31 for receiving neck portions of the preforms. The pallets run in tracks 32.

The flange 25 of the clamp 25 carries blowing apparatus to be described hereinafter, such blowing apparatus including stretch rods and blow heads.

It will be seen that when the clamp 24 is shifted by the fluid motors 27, it will simultaneously open the molds defined by the mold halves 20, 22 and close the molds defined by the mold halves 19, 21.

It is to be understood that the blow molding apparatus 15 as thus described is in and of itself not a part of this invention, but is the subject of prior applications of which certain of us are inventors.

This invention particularly relates to a shifting of the preform into one of the mold halves and the advancing of the stretch rod and blow head before the mold is closed, thereby reducing the operation cycle time.

The opposite ends of the tracks 32 are carried by carriages 33 which are supported by hangers 34 mounted for movement on support rods 35 carried by the clamp 24 and movable through the fixed platens 16, 17. The carriages 33 are each positioned by a double acting fluid motor 36 which is carried by the clamp 24 and coupled to the respective carriage 33. When the respective mold opens, the track 32 is shifted to a centered position relative to the open molds, as is shown to the left in FIG. 1. When the mold formed by the mold halves 19, 21 opens, the pallet 30 mounted in the track thereof has depending therefrom previously blow molded articles. That pallet is engaged at one end thereof by a following pallet carrying a plurality of preforms, and as the following pallet 30 enters into the track 32, the prior pallet is carried out of the blow molding apparatus 15 for movement to a blown article discharge station (not shown).

When the new pallet 30 enter into the track and is positioned therein, a suitable sensing device 37 senses the position of the pallet and actuates the associated fluid cylinder 36 so as to shift the tracks 32 and the pallet 30 toward the clamp 24 and to position the preform P in the mold half 21, as is best shown in FIG. 4. As soon as the preform is seated in the mold half 21, the positioning of the blowing apparatus is initiated.

Reference is now made to FIG. 2 wherein the general details of a portion of the blowing apparatus is shown. The clamp flange 25 carries at each end thereof an upright support 38 which has extending between the upper ends thereof a guide bar 39. The guide bar 39 has slidably journalled therein guide rods 40 which also extend through the flange 25 and have mounted on the lower ends thereof a blow head bar 41. The flow head bar 41 is carried by double acting fluid motors 42 carried by the flange 25 and coupled to opposite ends thereof for movement between a position closely underlying the flange 25 and an advanced position.

The support bar 43 is slidably mounted on upper portions of guide rods 40 and is vertically positioned by means of extensible fluid motors 44 which have their piston rods 45 coupled to the bar 41.

A stretch rod bar 46 is also slidably mounted on the guide rods 40 and carries a plurality of depending stretch rods 47. The stretch rod bar 46 is vertically positioned and supported by piston rods 48 of extensible fluid motors 49 which, in turn, are supported by the bar 43.

It is to be understood that for each mold cavity there is a blow head generally identified by the numeral 50 and having a blow stem 51 which is movable relative to the bar 41, after engaging and sealing with the upper end of a preform, to effect actuation of a valve mechanism 52 wherein blowing gas under pressure is introduced through the blow stem 51 into the preform P.

It will also be seen that each associated stretch rod 47 has a lower portion which extends through the blow head 50 and which is normally recessed within the blow stem 51 in a retracted position of the blow mechanism.

Referring now to FIG. 3, it will be seen that when the preform enters between the mold halves 19, 21, it is centered therebetween and is out of alignment with the blow stem 51 and the stretch rod 47 which are centered on the parting line of the mold half 21. However, as soon as the pallet 30 is sensed by the sensor 37 as being in its proper position and the associated cylinder 36 is actuated, the preform P is shifted to the right in a seated position in the mold half 21 and in alignment with the blow stem 51 and stretch rod 47, as is shown in FIG. 4.

At this time the stretch rod 47 and the blow head 50 may be moved downwardly with the stretch rod entering into the preform P but stopping at a position short of engaging the bottom end of the preform. At the same time the blow head 50 may move down to a position wherein the lower end of the blow stem 51 is adjacent to but spaced from the neck finish of the preform.

Depending upon the timing of the apparatus, the movement of the stretch rod 47 and the blow head 50 may be accomplished while the mold is still in its open position, or may be at least partially accomplished while the mold half 21 is being moved toward the fixed mold half 19. In any event, the stretch rod and the blow head will assume these lowered positions before the mold closes.

Figure 6:
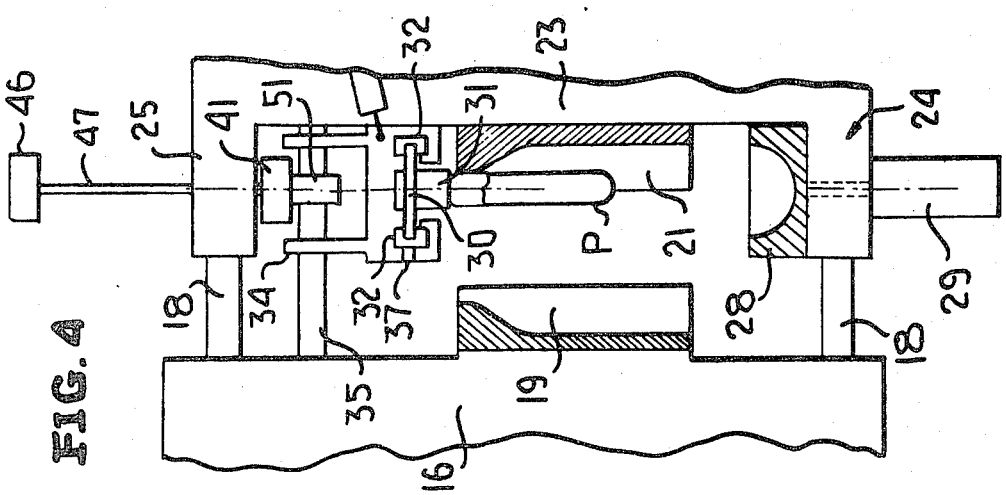
FIG. 6 is another schematic sectional view similar to FIG. 3, but with the clamp and movable mold half moved to a mold closing position and with the mold bottom moved up into position.

In FIG. 6 the clamp 24 has moved to the left and the mold half 21 has engaged the mold half 19 in closed relation. It is now necessary that pressure in the hydraulic cylinders 27 be built up to a preselected clamping pressure so as to prevent the mold halves from opening due to the internal pressures within the mold by the introduction of blowing gas into the preform at a pressure as high as on the order of 600 p.s.i. gauge.

As soon as the mold closes, the stretch rod is again moved down with the stretch rod engaging the bottom of the preform and functioning axially to elongate or stretch the preform P. The blow stem 51 is also brought down into sealed engagement with the upper end of the preform ready for the introduction of blowing gas under pressure into the preform as shown in FIG. 7.

When the mold has a separate bottom, such as the mold bottom 28, it is necessary that the mold bottom also be brought into position. The exact sequence of bringing the mold bottom 28 into position may be varied with the upward movement of the mold bottom being possibly initiated at the beginning of the mold closing stroke and with the mold bottom 28 being brought up tight against the underside of the mold halves 19, 21 as soon as they touch one another in the closing thereof.

When the preform is blow molded in two steps and wherein the first step is effected at a reduced blowing pressure, it is feasible to initiate the introduction of blowing gas into the preform as soon as the mold closes or soon thereafter as a slight amount of pressure may be built up in the cylinders 27. When a preselected pressure has been built up in the cylinders 27, high pressure blowing of the preform is initiated as is shown in FIG. 8.

It will be readily apparent from the foregoing that with the double acting clamp arrangement and the two sets of molds, while one set of preforms is being blow molded within the mold defined by the mold halves 20, 22, for example, the mold halves 19, 21 are open, and there is ample time for the discharge of the pallet carrying the blown articles and the introduction of a new pallet containing new preforms to be blow molded and for the positioning of the preforms into an associated mold half and the movement of the blow apparatus into position. As soon as the blow molding within the mold halves 20, 22 is completed, this phase of the cycle is over and the mold halves 20, 22 are opened while the mold halves 19, 21 are closed. Since the blowing apparatus is already in position when the mold closes and since the axial stretching of the preform is already initiated at the time the pressure in the cylinders 27 reaches an acceptable blowing pressure, it will be seen that after closing of the mold halves 19, 21 the blow molding of the preform P may be effected within a minimum time span.

At the present, the blow molding apparatus is set to complete a double blow molding cycle in 6 seconds with each shifting of the pallets requiring on the order of less than 1.5 seconds, thereby leaving 1.5 seconds for the positioning of the preforms in the mold halves and the general advancement of the blowing apparatus relative to the preform.

It is believed that this 6 second cycle can be further reduced, although it is much less than is presently available with any other type of equipment.

Although in accordance with the specific design of the molding apparatus 15 the blowing apparatus is carried by the clamp, it is also feasible that the molding apparatus be carried by the platens 16, 17. Should this be the case, then the fluid motors 36 will be carried by the platens and the preforms will be pulled into the fixed mold halves, as is shown in FIG. 9.

Although this invention is most useful in conjunction with the double acting apparatus of FIG. 1, it is also feasible to utilize the apparatus in conjunction with a single action molding apparatus. It is most beneficial in an apparatus wherein one of the mold halves is fixed. However, the apparatus can also be advantageously utilized in a molding apparatus where both mold halves move as is shown in FIG. 10.

Although only preferred embodiments of the invention have been specifically illustrated and described herein, it is to be understood that minor variations may be made in the apparatus and the sequence of operation without departing from the spirit of the invention as defined by the appended claims.

We claim:

1. A blow molding apparatus comprising a blow mold including blow mold halves, means for moving said blow mold halves between a closed blow molding position and an open combined blown article discharge and preform receiving position, a stretch rod and a blow head in constant alignment with one of said mold halves, means movable laterally relative to said one mold half for effecting discharge of a blown article from between said blow mold halves and the positioning of a preform between said blow mold halves in transverse alignment therewith, sensor means for sensing when a preform is in transverse alignment with said blow mold halves, means actuated by said sensor means for transversely shifting the preform into a seated position within said one blow mold half, and means for advancing said stretch rod into the preform seated within said one blow mold half and the blow head to a position adjacent the preform before mold closing is completed.

2. A blow molding apparatus according to claim 1 together with fluid cylinder means for effecting mold opening and closing, and means for further advancing said stretch rod to initiate preform stretching and said blow head to a sealed position relative to the preform upon closing of said mold by said fluid cylinder means and prior to a selected clamping pressure build up in said fluid cylinder means.

3. A blow molding apparatus according to claim 1 wherein there is a track associated with said blow mold in a generally centered position relative to said blow mold in an open state of said blow mold, a pallet for supporting a preform slidable into said track, means mounting said track for transverse movement toward said one blow mold half, and said means actuated by said sensor being connected to said track for effecting said transverse movement of said track.

4. A blow molding apparatus according to claim 3 wherein said blow mold is a multiple cavity mold and said pallet has means for supporting plural preforms.

5. A blow molding apparatus according to claim 3 wherein said mold halves are carried by a fixed platen and a movable clamp, and said track is mounted on a support extending between said platen and said track.

6. A blow molding apparatus according to claim 3 wherein said mold halves are carried by a fixed platen and a movable clamp, and said track is mounted on a support extending between said platen and said track, and said means actuated by said sensor is an extensible fluid motor.

7. A blow molding apparatus according to claim 5 wherein there is a second fixed platen on the side of said clamp remote from the first mentioned fixed platen, a second blow mold between said clamp and said second fixed platen including second mold halves carried by said clamp and said second fixed platen, and said second mold being closed when the first mentioned mold is open.

* * * * *